May 4, 1943.   C. B. VICKERS   2,318,437
SHOCK ABSORBER
Filed March 28, 1942
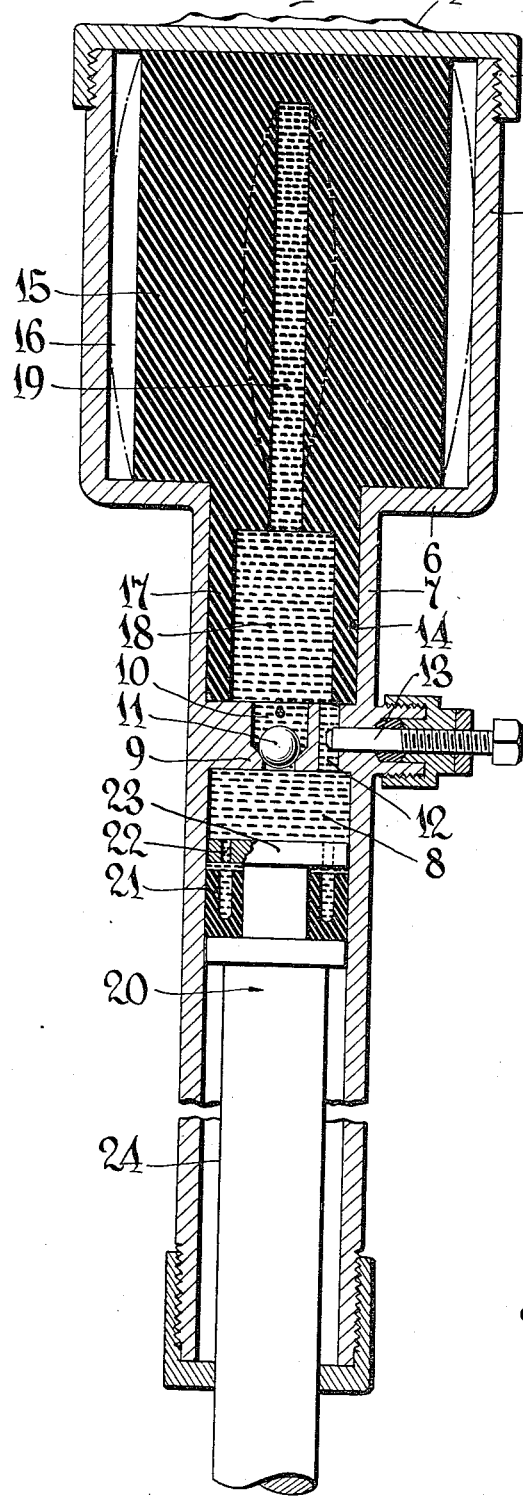
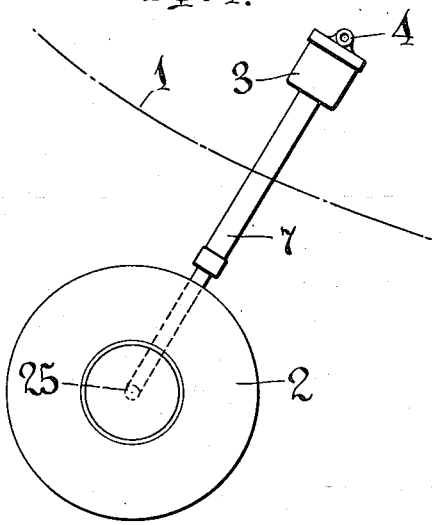
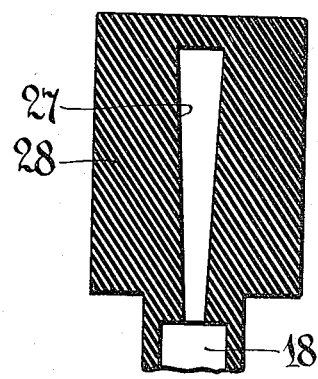
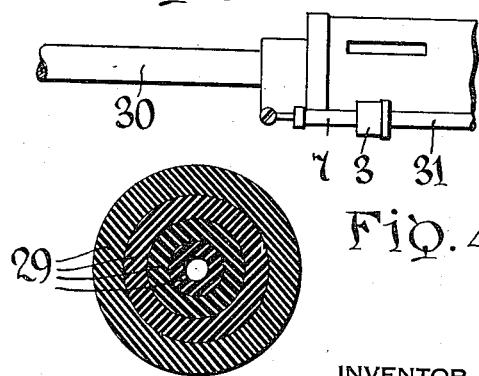
INVENTOR
Carroll B. Vickers,
BY
Bean, Brooks, Buckley & Bean.
ATTORNEYS Patented May 4, 1943

2,318,437

UNITED STATES PATENT OFFICE 2,318,437

SHOCK ABSORBER

Carroll B. Vickers, Buffalo, N. Y.

Application March 28, 1942, Serial No. 436,681

10 Claims. (Cl. 267—8)

This invention relates to a shock absorber and primarily to one adapted for absorbing or accommodating a violent impact of great intensity, the shock absorber of the present invention being designed for practical application to airplanes, gun mounts, and other fields of usefulness wherein heavy loads are encountered although its utility is not limited to such fields since the construction is such as to adapt itself readily to lighter uses in a practical manner.

In shock absorbers heretofore designed, the force of the impact has been received by the absorber with a gradually increasing degree of resistance until the moving body was finally arrested, at which time the resistance was greatest, with the result that the final portion of the impact was quite pronounced and acute and furthermore, the tendency toward rebound was great. In order to absorb this final portion of the impact in a practical manner the shock absorbing element has been increased considerably in size and weight so that the shock absorber became quite bulky and its installation a problem.

The primary object of the present invention is to provide a practical shock absorber which will initially spend the major portion of the force of the impact and ease off the remainder in a manner to absorb the shock with the least possible jar and wear on the body parts of the structure. The invention further has for its object to provide a shock absorber which is of simple and economical construction and is efficient in use. Furthermore, the invention contemplates the provision of means by which the heavier initial portion of the impact is absorbed under a greater resistance than the remaining portion of the blow or impact and thereby effects a gradual arrest of the body when a state of equilibrium has been reached.

In the accompanying drawing:

Fig. 1 is a diagrammatic view of the improved shock absorber showing one practical application thereof;

Fig. 2 is a longitudinal sectional view through the shock absorber, with parts left in elevation, more clearly depicting the construction thereof;

Fig. 3 is a fragmentary longitudinal section through a modified form of the shock absorbing body;

Fig. 4 is a transverse sectional view through a further modified embodiment of the invention; and Fig. 5 depicts another application of the shock absorber.

Referring more particularly to the drawing, the numeral 1 designates an airplane having a landing gear 2 to which latter the shock absorber of the present invention is applied.

The shock absorber comprises a casing 3, preferably of cylindrical construction having a mounting bracket 4. One end of the casing chamber 3 is closed by a head 5 to give access to the chamber, the opposite end or head 6 surmounting a cylinder 7 of relatively smaller diameter. Within the cylinder is a pump chamber 8 partitioned from the casing 3 by a wall 9 having a one way communication 10, closed against fluid flow from the casing by a check valve 11, and a bleed port 12 adjustable as to capacity by a metering pin 13. The partition wall 9 is set back within the casing end of the cylinder to provide a fluid sealing chamber 14.

Within the chamber 3 is placed a shock absorbing body 15 of rubber or other elastic material and preferably extending the full length of the chamber to receive support normally from the opposed heads 5 and 6 but being of smaller diameter to provide a predetermined clearance 16 for body expansion during use. The shock absorbing member 15 has a neck 17 snugly fitting the chamber 14 and preferably abutting the partition 9, this neck being formed with a chamber 18 into the outer end of which the passages 10 and 12 open from the pump chamber. From the inner end of this neck chamber extends a blind expansible chamber 19 in the form of a small axial bore terminating short of the casing head 5. This bore is calibrated in accordance with the load and the resistance offered by the expansible shock absorbing member 15.

A plunger or piston 20 operates in the pump chamber 8 on a body of liquid or fluid which fills the pump chamber 8 beneath the plunger, the counterbored sealing chamber 18, and the relatively restricted expansible chamber 19. The plunger carries an annular packing member 21 of channeled cross section with the channel opening through apertures 22 in a retaining flange 23 so that the fluid under compression will aid in holding the packing member operative.

With the chamber 3 mounted on one part of the structure, such as the airplane body, and the plunger rod 24 connected to the landing gear by a coupling 25, the impact of the wheels upon the ground when landing will react through the plunger 20 to place the fluid within the intercommunicating chambers under pressure. The surface area in the restricted bore forming the expansible chamber 19 is normally small and the resistance to expansion is greatest. However, at a predetermined hydraulic or fluid pressure the chamber 19 will expand, as indicated by the broken lines 26, and thereby increase the wall area on which the fluid will act, and this expansion will continue until the whole impact force has been absorbed or the absorption limit reached, as defined by the clearance 16. With the initial increase in surface area for the fluid pressure to act upon, the resistance to further expansion will be proportionately less. However, the initial resistance to expansion is designed to absorb the major portion of the impact force or shock and, therefore, the succeeding increments of the residual force will be offered correspondingly less resistance until the force has spent itself. Consequently, the body will be brought to rest in an easy manner. Subsequent to the lateral expansion against the side wall of the casing further shock will be absorbed in part by the body 15 as a cushion. The restriction of the bore 19 will be calibrated for the load to maintain a desired balance or equilibrium under normal conditions.

From the foregoing it will be observed that the greatest resistance is offered initially and the major portion of the impact blow will at that time be absorbed. Thereafter, the minor portion of the impact in excess to the force required to start the expansion of the chamber 19 will be absorbed with a gradually lessening degree of resistance so as to bring the load slowly to a stop.

The partition wall opening 10 will readily pass the fluid from the pump chamber into the expansion chamber at the time of impact but return flow will be confined solely to the metered port 12 which controls any rebound tendency. The pump chamber 8 may be connected to the casing 3 by means of a pipe (not shown) to enable the casing being disposed in a remote place, such pipe constituting in effect a continuation of the pump chamber.

The ballooning or dilation of the expansible chamber 19 may be controlled in a progressive manner by shaping the bore to meet the shock absorbing requirements. For example, the bore 27 in the absorbing body 28 may be tapered in one direction or the other, as depicted in Fig. 3, so that the ballooning or expansive action of the walls under the pressure of the fluid will be graduated in the direction of taper, and this graduated expansion will extend the period of major resistance over a longer interval of time.

The shock absorbing body may be of a laminated form, as illustrated in Fig. 4, with the laminae 29 of differing densities and degrees of elasticity to modify the shock absorbing action. If the outermost lamination is relatively soft then the ballooning action of the expansible chamber will be expedited. A different choice or arrangement will enable the outer ply or lamination to retard or confine the expansion. The body may be formed by internesting a plurality of sleeves or cups, one within the other and suitably lubricated to reduce friction.

While the foregoing description has been given with primary reference to the application of the invention to the landing gear for airplanes, its use is not confined thereto since it may be utilized to advantage in gun mounts, as shown in Fig. 5, to check the recoil. In this view the shock absorber is interposed between the gun 30 and a fixed part 31 on its support. The partition 9 may be eliminated in this application if desired.

The operation of the shock absorber is efficient in that it checks the initial impact force and eases off the remaining portion to avoid violent rebound. While the foregoing description has been given in detail, it is not the intention thereby to unduly limit the invention since it is obvious that the inventive principles involved are capable of other physical embodiments without departing from the spirit or scope of the invention claimed. Furthermore, while the invention is especially designed to absorb impacts of violent intensity and under heavy loads, it is obvious that its use is not confined to such class since its utility is widespread and its application will be readily made in any field where the main shock is initially absorbed and followed by an easing off movement, such as in certain machines and power tools which are brought up to the work piece in quick order and then its actual contact effected with a retarded movement.

What is claimed is:

1. A shock absorber comprising a cylindrical casing closed at one end by a wall and having a sealing chamber in its opposite end wall communicating with a pump chamber through an interposed partition wall, a shock absorbing body of elastic material confined in the casing by its end walls, the normal diameter of the body being sufficiently less to provide a clearance for radial expansion toward the side wall of the casing, the body having a hollow neck fitting within the sealing chamber and against the partition wall, the latter having a check valve and bleed opening opening into the neck, the elastic body having an expansible chamber closed at one end and opening at its opposite end into the hollow neck, a plunger operable in the pump chamber and having a channeled packing opening toward the partition wall to be forced by the fluid pressure into sealing contact with the plunger body and chamber wall, and means for adjusting the size of the bleed opening.

2. A shock absorber comprising a cylindrical casing closed at one end by a wall and having a sealing chamber in its opposite end wall communicating with a pump chamber through an interposed partition wall, a shock absorbing body of elastic material confined in the casing by its end walls, the normal diameter of the body being sufficiently less to provide a clearance for radial expansion toward the side wall of the casing, the body having a hollow neck fitting within the sealing chamber and against the partition wall, the latter having a check valve and bleed opening opening into the neck, the elastic body having an expansible chamber closed at one end and opening at its opposite end into the hollow neck, and means for subjecting the fluid in the pump chamber to pressure.

3. A shock absorber comprising a cylindrical casing closed at one end by a wall and having a sealing chamber in its opposite end wall communicating with a pump chamber through an interposed partition wall, a shock absorbing body of elastic material confined in the casing by its end walls, the normal diameter of the body being sufficiently less to provide a clearance for radial expansion toward the side wall of the casing, the body having a hollow neck fitting within the sealing chamber and against the partition wall and also having a relatively small bore constituting an expansible chamber, the partition wall having a port therethrough, and means operable to transmit the force of an impact through the fluid in the pump chamber to that in the bore.

4. A shock absorber comprising a cylindrical casing closed at one end by a wall and having a sealing chamber in its opposite end wall communicating with a pump chamber through an interposed partition wall, a shock absorbing body of elastic material confined in the casing by its end walls, the normal diameter of the body being sufficiently less to provide a clearance for radial expansion toward the side wall of the casing, the elastic body having an expansible chamber closed at its inner end and open at its outer end and in communication thereat with the pump chamber through the partition wall, and means operable by the force of an impact to subject the fluid in the intercommunicating pump and expansible chambers to pressure.

5. A shock absorber comprising a body of expansible elastic material having a fluid containing expansible chamber therein in the form of a small centrally disposed bore closed at one end and open at the other, impact responsive means in communication with the open end for subjecting the fluid in the expansible chamber to pressure, and means supporting the body for responding to the expansive action of the fluid alone.

6. A shock absorber comprising a body of expansible elastic material having a fluid containing expansible chamber therein in the form of a small centrally disposed bore closed at one end and open at the other, impact responsive means in communication with the opened end for subjecting the fluid in the expansible chamber to pressure, and means for confining the expansion of the chamber to a radial direction.

7. A shock absorber comprising a body of expansible elastic material having a fluid containing expansible chamber therein in the form of a small centrally disposed bore closed at one end and open at the other, impact responsive means in communication with the open end for subjecting fluid in the expansible chamber to pressure, means for confining the expansion of the chamber to a radial direction, and means for limiting the radial expansion.

8. A shock absorber comprising a body of expansible elastic material having a fluid containing expansible chamber therein in the form of a small centrally disposed bore closed at one end and open at the other, the bore tapering in one direction, impact responsive means in communication with the open end for subjecting fluid in the expansible chamber to pressure, and means supporting the body for responding to the fluid pressure.

9. A shock absorber comprising a body of expansible elastic material having a fluid containing expansible chamber therein in the form of a small centrally disposed bore closed at one end and open at the other, the body being formed of a plurality of internested sleeves, impact responsive means in communication with the open end for subjecting the fluid in the expansible chamber to pressure, and means supporting the body for expanding in response to the fluid pressure.

10. A shock absorber comprising a body of expansible elastic material having a fluid containing expansible chamber therein in the form of a small centrally disposed bore closed at one end and open at the other, the body being formed of a plurality of internested sleeves having differing degrees of elasticity, impact responsive means in communication with the open end for subjecting the fluid in the expansible chamber to pressure, and means supporting the body for expanding under the action of the fluid pressure.

CARROLL B. VICKERS.